USOO5751508A

United States Patent [19]
Karidis

[11] Patent Number: 5,751,508
[45] Date of Patent: May 12, 1998

[54] DISK DRIVE WITH ACTUATOR TO OVERCOME STICTION

[75] Inventor: John Peter Karidis, Ossining, N.Y.

[73] Assignee: International Business Machines Corporation, Armonk, N.Y.

[21] Appl. No.: 690,705

[22] Filed: Jul. 31, 1996

[51] Int. Cl.$^6$ .................................................. G11B 33/14
[52] U.S. Cl. ................................. 360/97.01; 360/75
[58] Field of Search .................... 360/75, 71, 69, 360/137, 97.01, 98.07, 99.04, 99.08, 128

[56] References Cited

FOREIGN PATENT DOCUMENTS 0205757  8/1989  Japan ........................................ 360/75

*Primary Examiner*—Andrew L. Sniezek
*Attorney, Agent, or Firm*—Heslin & Rothenberg, P.C.

[57] ABSTRACT

A system for overcoming force which inhibits movement of a data storage device is provided. An actuator is mounted at the perimeter of a circular data storage device and has a pivoting armature. The armature is mounted to pivot into contact with the perimeter of the storage device thereby initiating movement thereof and overcoming any force inhibiting the movement thereof, and to pivot out of contact with the perimeter of the storage device to allow for subsequent rotation thereof.

5 Claims, 1 Drawing Sheet

DISK DRIVE WITH ACTUATOR TO OVERCOME STICTION

RELATED APPLICATION INFORMATION

This application claims the benefit of U.S. provisional application Ser. No. 60/003,831, entitled "Disk Drive With Impulse Torque Generating Element," filed Sep. 15, 1995. The provisional application is hereby incorporated by reference herein in its entirety.

TECHNICAL FIELD

This invention relates to data storage systems. More particularly, this invention relates to a system for overcoming forces which inhibit initial movement of a moveable data storage device in a data storage system.

BACKGROUND OF THE INVENTION

Direct access storage devices ("DASD") often employ the contact start stop ("CSS") method to park the sliders thereof during power off mode. The sliders under appropriate conditions can become attached to the disk surface, and may cause larger than expected stiction force, i.e., a force which tends to inhibit movement of the disk. For a 2.5" disk drive with 4-sliders, the average stiction torque is about 100 g.cm, and a spindle motor can typically produce a static torque of only 80 g.cm. A conventional spindle motor using the known "vibration method" of overcoming stiction can produce sufficient starting torque to overcome the average stiction torque. But any significant increase in stiction torque can prevent a DASD from spin up, thereby rendering the DASD unusable.

What is required, therefore, is a system for overcoming stiction forces in a data storage system which tend to inhibit initial movement of the data storage device (e.g., disk).

SUMMARY OF THE INVENTION

The shortcomings of the conventional techniques are overcome by the present invention which in one aspect is a system for overcoming force which inhibits movement of a data storage device in a data storage system. An actuator is mounted at the perimeter of a circular data storage device and has a pivoting armature. The armature is mounted to pivot into contact with the perimeter of the storage device thereby initiating movement thereof and overcoming any force inhibiting the movement thereof, and to pivot out of contact with the perimeter of the storage device to allow for subsequent rotation thereof.

BRIEF DESCRIPTION OF THE DRAWING

The subject matter which is regarded as the invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawing in which:

DETAILED DESCRIPTION OF THE PREFERRED EMBODIMENT(S)

Figure 1:
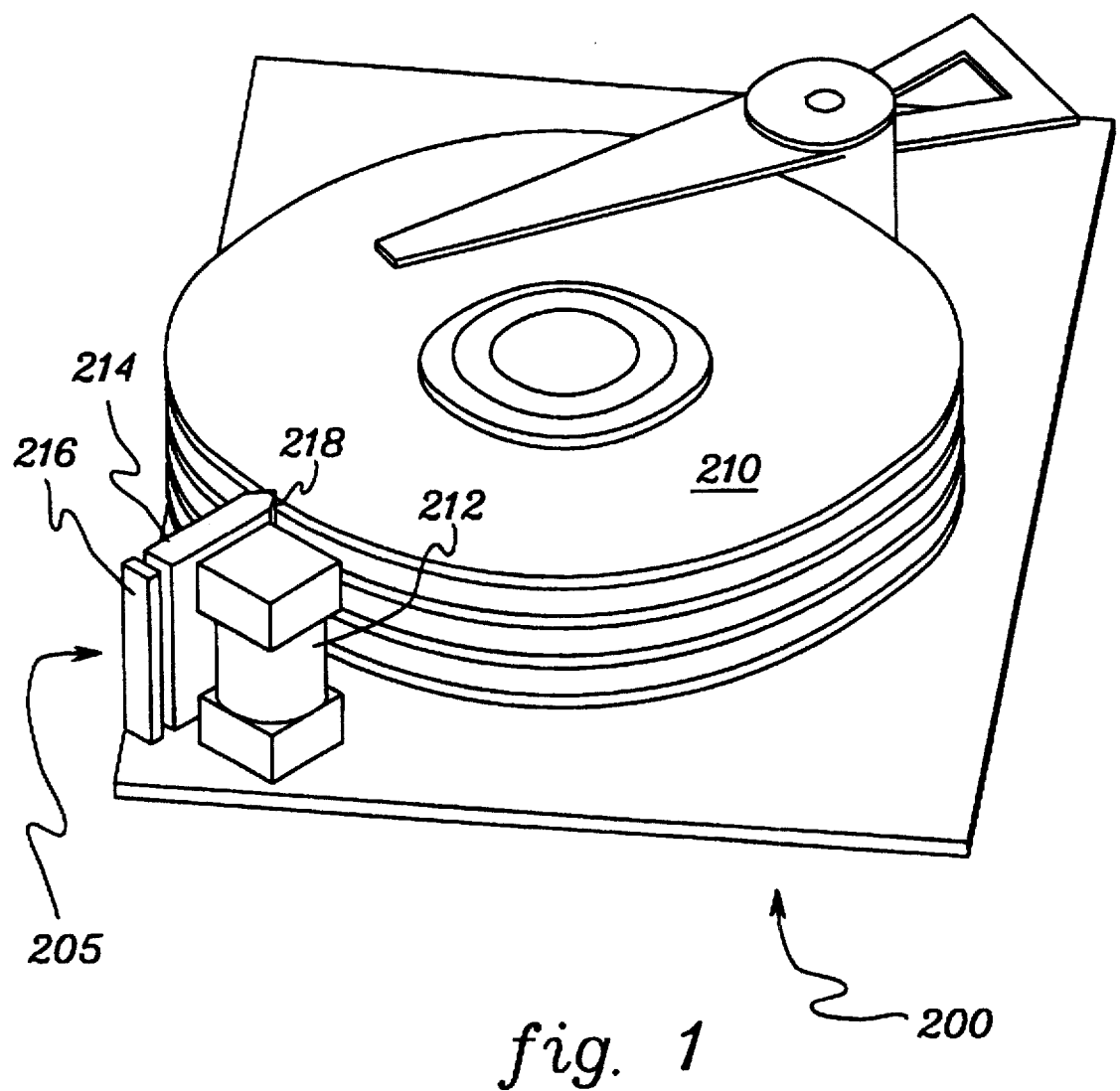
FIG. 1 is an embodiment of the present invention wherein an actuator is used at the perimeter of the disk to overcome the stiction forces thereon.

As discussed above, magnetic disk drives are exposed to stiction induced failure when contact start stop technology is used.

As illustrated in FIG. 1, what may be added to a disk drive 200 is a small separate actuator 205 which is capable of applying a very large torque to the disk stack 210 over a small angle, as an emergency safety measure to ensure that stiction does not prevent the disk from spinning up.

As an example of how such an actuator may work where the spindle motor has tried and failed to spin up the disks, a small electromagnetic actuator 205 is packaged into a corner of the housing just outside the disk. This clapper-type actuator may have a pivoting armature 214 which, when pulled towards the stator 212, has one (polymer tipped) end 218 which contacts the outside edge of the disk(s) while the second (pivoting) end is wedged against an anchored stiff spring or rubber block 216. As the armature continues to get pulled towards the stator, the toggling action between the compliant mount and the disk edge produces a radial force on the disk (not enough to cause disk slippage) and a smaller tangential force (limited by the friction between the armature and the disk edge unless the disk edge has tooth-like features). Because of the large forces (over a limited stroke) which can be generated with a clapper actuator, sufficient torque may be generated to break the stiction bond between the disk and the head. The actuator is positioned so that even when the armature is fully in contact with the stator, the armature is not oriented radially with respect to the disk. By having the armature not reach the unstable equilibrium point of the "toggle-like" design, when the armature is released from the stator it will return to its original position while the disk stack rotates backwards a small amount. At this point (when the armature is back out of contact with the disk and the stiction bond has been broken) the spindle motor can be energized to spin up the disk.

While the invention has been described in detail herein in accordance with certain preferred embodiments thereof, many modifications and changes therein may be affected by those skilled in the art. Accordingly, it is intended by the following claims to cover all such modifications and changes as fall within the true spirit and scope of the invention.

What is claimed is:

1. A data storage system, comprising:
    a circular data storage device; and
    an actuator mounted at a perimeter of said circular data storage device and having a moving armature, the moving armature being mounted to:
        move into contact with the perimeter of said circular data storage device thereby initiating movement thereof and overcoming any force inhibiting the movement thereof, and
        move out of contact with the perimeter of said storage device to allow for subsequent rotation thereof.

2. The data storage system of claim 1, wherein:
    said actuator comprises a stator in operative relationship with the moving armature and for electromagnetically moving the armature into and out of contact with the perimeter of said data storage device.

3. The data storage system of claim 1, wherein said actuator is mounted using a compliant mounting to allow further movement of the moving armature after its initial contact with the perimeter of said data storage device.

4. The data storage system of claim 3, wherein compliance of the compliant mounting is chosen to avoid excessive load on said data storage device while the moving armature is in contact with said data storage device.

5. The data storage system of claim 1, wherein the moving armature is pivotably mounted to pivot into and out of contact with the perimeter of said data storage device.

* * * * *